(12) United States Patent
Cragun

(10) Patent No.: US 9,552,152 B2
(45) Date of Patent: Jan. 24, 2017

(54) PRESENTLY OPERATING HAND DETECTOR

(71) Applicant: MX Technologies, Inc., Lehi, UT (US)

(72) Inventor: Jason Cragun, Pleasant Grove, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 118 days.

(21) Appl. No.: 13/694,789

(22) Filed: Jan. 4, 2013

(65) Prior Publication Data
US 2014/0195936 A1 Jul. 10, 2014

(51) Int. Cl.
G06F 3/0484 (2013.01)
G06F 3/0488 (2013.01)
G06F 1/16 (2006.01)
G06F 3/041 (2006.01)

(52) U.S. Cl.
CPC .......... G06F 3/0488 (2013.01); G06F 1/1686 (2013.01); G06F 1/1694 (2013.01); G06F 3/0416 (2013.01)

(58) Field of Classification Search
CPC .... G06F 3/0488; G06F 1/1694; G06F 1/1686; G06F 3/0416
USPC ......................................... 715/763
See application file for complete search history.

(56) References Cited

U.S. PATENT DOCUMENTS

| 8,760,426 | B1* | 6/2014 | Strand et al. ................. 345/173 |
| 2007/0236460 | A1* | 10/2007 | Young et al. ................. 345/169 |
| 2010/0097331 | A1* | 4/2010 | Wu .............................. 345/173 |
| 2010/0134423 | A1* | 6/2010 | Brisebois ............ G06F 3/03547 345/173 |
| 2013/0275907 | A1* | 10/2013 | Lau ....................... G06F 3/0488 715/773 |

* cited by examiner

Primary Examiner — William Bashore
Assistant Examiner — Nathan Shrewsbury
(74) Attorney, Agent, or Firm — Kunzler Law Group, PC

(57) ABSTRACT

On a mobile electronic device, a user may manually or automatically select between a first user interface configured to persons having a left dominant hand (or simply operating the device with the left hand), and a second user interface configured to persons having a right dominant hand (or simply operating the device with the right hand).

20 Claims, 2 Drawing Sheets

PRESENTLY OPERATING HAND DETECTOR

Method, System and Software for Ascertaining the Dominant and/or Presently Operating Hand of a User of a Mobile Electronic Device Method, System and Software for Displaying a User-Interface on a Mobile Electronic Device that is Configured Based on the Dominant and/or Presently Operating Hand of a User of the Device

BACKGROUND

Each human has a dominant hand. For about 90% of the population, the dominant hand is the right hand. In the prior art, software interfaces for mobile electronic devices ("MED's") such as smart phones, tablet computers, notebook computers, laptop computers, etc. were designed to emphasize various features, such as aesthetics, symmetry, and other characteristics. However, efforts were not made to tailor user interfaces to the dominant hand of the user or to optimize the user interface based on the certain hand operating the device.

SUMMARY

A system, method and software are needed which determine the dominant and/or presently operating hand of a MED user and dynamically reconfigure the user interface of the MED to maximize convenience and usability for that dominant and/or presently operating hand. Numerous techniques can be utilized to determine, at the present time of use, the dominant and/or operating hand of a user, as described below.

DETAILED DESCRIPTION

Figure 1:
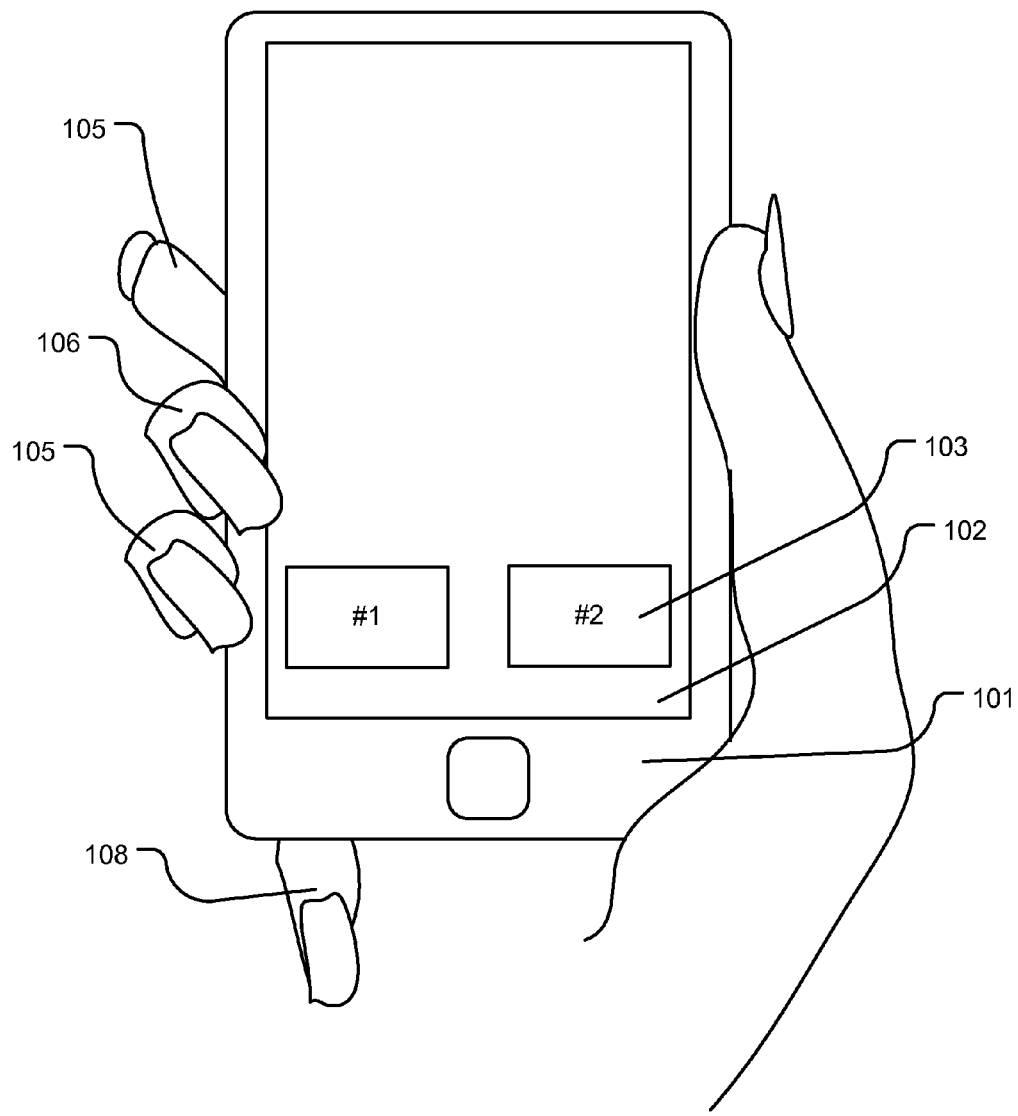
FIG. 1 depicts a user operating an MED with his/her right hand.

Referring to FIG. 1 an example MED 101 is shown being used by a user who is right hand dominant or is presently operating the device with the right hand. The user has his/her right thumb 104 on the right side of the device display screen 102 adjacent buttons 103 which may be pressed when desired. The user's little finger 108 may be at the bottom of the device 101 to support it. The user's index finger and two other fingers 105, 106 and 107 are on the left side of the device, the side opposite the thumb or on the back of the device 104.

In its simplest manifestation, the invention includes two user interfaces. A first user interface is laid out for a right-hand dominant or right hand operating user. A second user interface is laid out for a left-hand dominant or left hand operating user. The two user interfaces may be mirror images of each other, or they may be distinctly arranged. A switch or button, implemented as a software switch or button or a hardware switch or button, may be used to select or switch between the first and second user interfaces, depending on the user's preference. Generally a user will find it more comfortable to press buttons on the MED screen that are relatively farther from the junction of the user's thumb and hand, and it is anticipated that the user interfaces will be arranged so that the most commonly used buttons will be farthest from the thumb-to-hand junction. The left/right switch or button could be simply clicked to switch between the two user interfaces, or the functionality of the interface could be dragged from one side of the screen to the other depending on location most preferred by user.

In another embodiment of the invention, the software running on the MED will make a determination of which of the user's hands is the user's dominant and/or presently operating hand, and will then automatically optimize the user interface appropriately for that dominant and/or presently operating hand.

The invention may also be used to dynamically and continuously track which hand the user is utilizing to operate a MED, switching between right hand and left hand user interfaces as the user switches the device from one hand to the other. It is also possible for the MED to permit a user to switch back to a prior user interface in the event the changed optimization does not suit the user.

Several techniques can be used to determine the dominant and/or operating hand of a user.

Accelerometer. An accelerometer is a device that can measure the force of acceleration, whether caused by gravity or by movement. An accelerometer can therefore measure the speed of movement of an object it is attached to. Because an accelerometer senses movement and gravity, it can also sense the angle at which the device is being held. By incorporating an accelerometer into an MED, the accelerometer can sense the tilt, movement and speed being applied to them, as well as the direction in relation to the MED's screen. Generally this allows the MED to adjust its visual output to make it appropriate to the direction of the screen. In this way you can view lists with the screen held vertically and watch videos with the screen held sideways or vice versa as desired.

However, as applied to dominant and/or presently operating hand detection, the accelerometer can provide further information. Often, a user who is right hand dominant (or simply presently using the device in the right hand) will hold an MED with the lower left hand corner of the device slightly lower than the lower right hand corner. And a user who is left hand dominant (or simply presently using the device in the left hand) will hold an MED with the lower right hand corner of the device slightly lower than the lower left hand corner. By noting the relative positions of the lower left and right hand corners of the MED, it is possible to make a determination whether the user is operating the device in the right or left hand. Once this determination has been made, the device can automatically optimize the user interface accordingly for that particular user (right hand interface or left hand interface).

Gravitometer. An accelerometer provides more information than is actually needed for dominant and/or operating hand detection. Therefore, a simple gravitometer can be substituted to determine whether the lower left hand corner of the MED or the lower right hand corner of the MED is more frequently in the lowest position, thus revealing the dominant and/or presently operating hand of the user.

Figure 2:
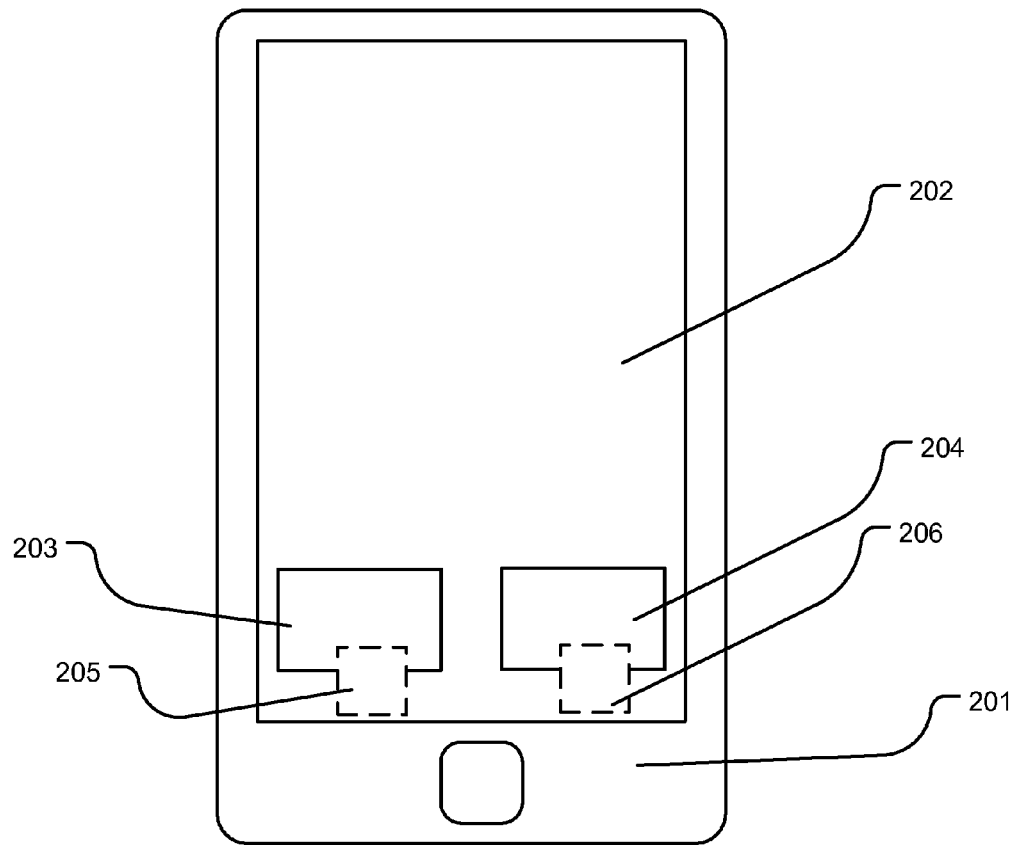
FIG. 2 depicts regions of buttons where a right dominant hand user (or simply a user operating the device with the right hand) may press the buttons.

Button Push Location. When a user reaches for a button on a touch screen of a MED, it is common for the user to press either the lower part of the button or the area just below the button. It is also common for a right-handed (or right hand operating) user when attempting to touch a button on the left side of a touch screen to touch the right side of the button. And it is common for a left-handed (or left hand operating) user when attempting to touch a button on the right side of the screen to touch the left side of the button. It is common for a right-handed (or right hand operating) user when attempting to touch a button on the right side of the screen to touch the center of the button. And it is common for a left-handed (or left hand operating) user when attempting to touch a button on the left side of the screen to touch the center of the button. Therefore, by noting the location of a button on the screen and the region of the button where the user has touched it, dominant and/or presently operating hand of the user can be determined. Referring to FIG. 2, these principles are briefly illustrated. An MED 201 with display screen 202 is depicted. The screen has various buttons 203 and 204 on it. For each button, a region of likely strikes or button presses 205 and 206 are shown as would be expected for a right-handed (or right hand operating) user.

Gyroscope. A gyroscope is a device for measuring device orientation. A gyroscope can be a mechanical or semiconductor device. By sensing orientation of an MED, a gyroscope can inform the software operating on the MED how to best optimize the interface based on which hand it detects is presently operating the device.

Camera. When a user operates a MED one-handed, typically the user holds the MED in his or her dominant hand and uses the thumb of the dominant hand to press buttons on the screen of the MED. Thus, the thumb is the most active digit of the operating hand. By observing the activity of the thumb, and the side of the screen from which it originates, it is possible to make a determination of the dominant hand and/or presently operating hand of the MED user. If the thumb activity originates from the right hand side of an MED, then the user is right hand dominant and/or presently operating the device with the right hand, and the MED can automatically switch to a user interface appropriate for a right hand operating user. If the thumb activity originates from the left hand side of an MED, then the user is left hand dominant and/or presently operating the device with the left hand, and the MED can automatically switch to a user interface appropriate for a left hand operating user. The camera of an MED, if appropriately positioned, can be used to note the movement of a thumb from the right or left side of an MED screen to a button on the MED screen, thus determining dominant and/or presently operating hand of the user.

Finger Presence. Often a user will hold an MED in his or her hand, with his or her thumb on one side of the MED and at least two to four of his or her remaining fingers on the other side back or bottom of the MED. Frequently the user's dominant or operating hand little finger will be at the bottom of the MED to support it. Thus, two to four fingers will be present along one side of the MED. Once the presence of those fingers is ascertained, the dominant and/or operating hand can be determined. For example, if the user has between two to four fingers along the left side of the MED, the user is right hand dominant (or simply operating the device with the right hand). And if the user has between two to four fingers along the right side of the MED, the user is left hand dominant (or simply operating the device with the left hand).

The presence of fingers along one side or the other of the MED can be ascertained by several methods. One method is to use the touch screen to sense the presence of multiple fingers resting on one side of it or the other. That presence can be sensed by the slight pressure the fingers exert on the MED screen. Once that finger presence is sensed, the dominant and/or presently operating hand is known. Another method is to use the MED camera, if appropriately positioned, to observe the fingers resting on one side or the other of the MED. Again, once the position of the resting fingers has been observed, the dominant and/or operating hand is known. A third method is to sense the heat from the resting fingers. Once the side of the MED with multiple heat sources, i.e., fingers, has been determined, the dominant hand and/or presently operating hand is known.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
providing a first user interface that is arranged for one or more of a right-hand dominant user and a right-hand operating user;
providing a second user interface that is arranged for one or more of a left-hand dominant user and a left-hand operating user;
providing a selector for selecting between the first and second interfaces;
providing a presently operating hand detector that determines resting locations for one or more of the user's fingers location to determine one or more of the user's dominant hand and presently operating hand, the resting locations for one or more of the user's fingers determined based on input received from a camera of a device, the camera detecting positions for one or more of the user's fingers on one or more of a right side and a left side of the device; and
displaying on the display one of the first and second user interfaces selected by the selector, the selector selecting one of the first and second user interfaces to display based on the presently operating hand detector.

2. A method as recited in claim 1, wherein the selector is selected by a user operating the device.

3. A method as recited in claim 1, wherein the selector is a hardware switch.

4. A method as recited in claim 1, wherein the selector is a software button.

5. A method as recited in claim 1, wherein the first user interface locates more commonly-used buttons on a left side of the screen display.

6. A method as recited in claim 1, wherein the first user interface locates more commonly-used buttons on a right side of the screen display.

7. A method comprising:
providing a first user interface that is arranged for one or more of a right-hand dominant user and a right hand operating user;
providing a second user interface that is arranged for one or more of a left-hand dominant user and a left hand operating user;
providing a presently operating hand detector that determines whether one of a user one or more of has a dominant left hand and is presently operating the device in the left hand and a user one or more of has a dominant right hand and is presently operating the device in the right hand, wherein the presently operating hand detector determines one or more of the user's dominant hand and presently operating hand based on input received from a camera of a device, the camera monitoring movement of a thumb of the user from a side of the device to a button presented on a display of the device, the thumb movement indicating the one or more of the user's dominant hand and presently operating hand;

selecting between the first and second interfaces based on information from the presently operating hand detector; and displaying on the screen display the user interface selected by the selector.

8. A method as recited in claim 7, wherein the selecting and displaying steps are performed automatically by software running on the device.

9. A method as recited in claim 7, wherein the presently operating hand detector uses an accelerometer.

10. A method as recited in claim 7, wherein the presently operating hand detector uses a gravitometer.

11. A method as recited in claim 7, wherein the presently operating hand detector uses a gyroscope.

12. A method as recited in claim 7, wherein the presently operating hand detector uses a camera.

13. A method as recited in claim 7, wherein the presently operating hand detector uses finger location to determine a user's dominant hand.

14. A method as recited in claim 7, wherein the presently operating hand detector measures which corner of the device is closest to the ground in determining the user's presently operating hand.

15. A method as recited in claim 7, wherein the presently operating hand detector uses relative button push location to determine the user's presently operating hand.

16. An apparatus comprising:
an electronic device;
a touch screen display electrically connected to the electronic device;
a first user interface displayable on the touch screen display that is arranged for one or more of a right-hand dominant user and a right-hand operating user;
a second user interface displayable on the touch screen display that is arranged for one or more of a left-hand dominant user and a left-hand operating user;
a selector of the electronic device that selects between the first and second interfaces; and
a presently operating hand detector that determines resting locations for one or more of the user's fingers to determine one or more of the user's dominant hand and presently operating hand, the resting locations for one or more of the user's fingers determined based on input received from a camera of a device, the camera detecting positions for one or more of the user's fingers on one or more of a right side and a left side of the device,
wherein one of the first and second user interfaces selected by the selector is displayed on the touch screen display, the selector selecting one of the first and second user interfaces to display based on the presently operating hand detector.

17. The apparatus of claim 16, wherein the input received on the touch screen display comprises an amount of pressure applied to the touch screen display by one or more of the user's fingers.

18. The apparatus of claim 16, further comprising a camera electrically connected to the electronic device, wherein the resting locations for one or more of the user's fingers are determined based on input received from the camera.

19. The apparatus of claim 18, wherein the camera input comprises input associated with movement of the user's thumb, wherein the presently operating hand detector uses the thumb movement input from the camera to determine one or more of the user's dominant hand and presently operating hand.

20. The apparatus of claim 16, wherein the first and second user interfaces comprise buttons arranged such that most commonly used buttons are located farthest from a thumb-to-hand junction of the determined one or more of the user's dominant hand and presently operating hand.

* * * * *